US012084982B2

(12) United States Patent
Banhos et al.

(10) Patent No.: US 12,084,982 B2
(45) Date of Patent: Sep. 10, 2024

(54) FLANGE AND ASSEMBLY FOR GAS TURBINE ENGINE CASE

(71) Applicant: Raytheon Technologies Corporation, Farmington, CT (US)

(72) Inventors: Jonas Banhos, West Hartford, CT (US); Thiago B. Vieira, Sarasota, FL (US); Anthony J. Prainito, Shelton, CT (US); James T. Roach, Vernon, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/958,946

(22) Filed: Oct. 3, 2022

(65) Prior Publication Data

US 2024/0110492 A1 Apr. 4, 2024

(51) Int. Cl.
*F01D 25/24* (2006.01)

(52) U.S. Cl.
CPC ...... *F01D 25/243* (2013.01); *F05D 2220/323* (2013.01); *F05D 2230/60* (2013.01); *F05D 2240/12* (2013.01); *F05D 2240/14* (2013.01)

(58) Field of Classification Search
CPC .. F01D 25/243; F01D 25/265; F05D 2230/60; F05D 2230/80; F05D 2240/14; F05D 2260/94; F05D 2260/941; F05D 2260/36; F05D 2300/6033; F05D 2300/603
See application file for complete search history.

(56) References Cited

U.S. PATENT DOCUMENTS

| | | | | |
|---|---|---|---|---|
| 6,305,905 B1* | 10/2001 | Nagle | B64C 11/04 416/204 R |
| 8,079,773 B2* | 12/2011 | Blanton | F16L 47/14 403/41 |
| 9,140,135 B2 | 9/2015 | Robertson, Jr. | |
| 11,371,390 B2* | 6/2022 | Banhos | F01D 25/243 |
| 2008/0206044 A1* | 8/2008 | Porte | B64D 33/02 244/1 N |
| 2010/0000227 A1* | 1/2010 | Porte | B64D 33/02 415/200 |
| 2013/0202430 A1* | 8/2013 | Gaudry | F02C 7/32 415/214.1 |
| 2014/0044539 A1* | 2/2014 | Harada | B29C 66/721 415/214.1 |
| 2014/0086678 A1 | 3/2014 | Cazuc | |
| 2016/0201505 A1* | 7/2016 | Clarkson | F02C 7/20 415/200 |

(Continued)

OTHER PUBLICATIONS

European Search Report for EP Application No. 23201454.8 dated Feb. 13, 2024.

*Primary Examiner* — Juan G Flores
*Assistant Examiner* — Ryan C Clark
(74) *Attorney, Agent, or Firm* — Carlson, Gaskey & Olds, P.C.

(57) ABSTRACT

A flange stiffener support for a duct in a gas turbine engine includes a circumferential flange segment that has a plurality of flange fastener openings. An axial body segment extends from a radially inner side of the circumferential segment and has at least one body fastener opening. The axial body segment extends at least partially along a circumferential distance of the circumferential flange segment.

18 Claims, 10 Drawing Sheets

(56) References Cited

U.S. PATENT DOCUMENTS

| | | | | |
|---|---|---|---|---|
| 2016/0208652 | A1* | 7/2016 | Rogers | F01D 9/042 |
| 2019/0084894 | A1* | 3/2019 | Roberts | C04B 37/003 |
| 2019/0162077 | A1* | 5/2019 | Ghosh | F01D 25/164 |
| 2021/0003038 | A1* | 1/2021 | Banhos | F01D 25/28 |

* cited by examiner

FLANGE AND ASSEMBLY FOR GAS TURBINE ENGINE CASE

BACKGROUND

This disclosure relates to a gas turbine engine, and more particularly to gas turbine engine components having flanges.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

The engine typically includes one or more ducts that convey airflow through a gas path of the engine. Some ducts may be made of a composite material and may have one more flanges for mounting the duct to another component.

SUMMARY

In one exemplary embodiment, a flange stiffener support for a duct in a gas turbine engine includes a circumferential flange segment that has a plurality of flange fastener openings. An axial body segment extends from a radially inner side of the circumferential segment and has at least one body fastener opening. The axial body segment extends at least partially along a circumferential distance of the circumferential flange segment.

In another embodiment according to any of the previous embodiments, a flange fillet segment extends from the radially inner side of the circumferential flange segment with an axial length less than an axial length of the axial body segment. The flange fillet segment is circumferentially spaced from the axial segment.

In another embodiment according to any of the previous embodiments, the axial length of the axial body segment is greater than a radial height of the circumferential segment.

In another embodiment according to any of the previous embodiments, the circumferential segment, the axial body segment, and the flange fillet segment form a single unitary piece.

In another embodiment according to any of the previous embodiments, the flange fillet segment extends axially aft of an aft most surface on the circumferential segment.

In another embodiment according to any of the previous embodiments, the circumferential flange segment includes one of a protrusion or a channel. The axial body segment and flange fillet segment each include the other of the protrusion or the channel.

In another embodiment according to any of the previous embodiments, the axial body segment abuts a circumferential end of the flange fillet segment.

In another embodiment according to any of the previous embodiments, each of the protrusion and the channel include a lengthwise direction that extends circumferentially with the circumferential segment.

In another embodiment according to any of the previous embodiments, axial body segment extends a first circumferential distance. The flange fillet segment extends a second circumferential distance different from the first circumferential distance.

In another embodiment according to any of the previous embodiments, a circumferential end of the axial body segment abuts a circumferential end of the flange fillet segment and a longitudinal axis of the at least one fastener body opening extends substantially perpendicular to a longitudinal axis the plurality of fastener openings in the circumferential segment.

In another embodiment according to any of the previous embodiments, the protrusion includes one of a dovetail profile or an arcuate profile.

In another embodiment according to any of the previous embodiments, the protrusion includes a fir tree profile.

In another exemplary embodiment, a gas turbine engine includes a fan section and a compressor section. A turbine section drives the fan section and the compressor section. A duct assembly includes a first duct including a main body and a first flange. The first duct is made of a composite material. A second duct include a main body and a second flange. A flange stiffener support engaging the first flange including a circumferential flange segment having a plurality of fastener opening. An axial body segment extends from a radially inner side of the circumferential segment having at least one body fastener opening. The axial body axial segment extends at least partially along a circumferential distance of the circumferential flange segment.

In another embodiment according to any of the previous embodiments, a flange fillet segment extending from the radially inner side of the circumferential flange segment with an axial length less than an axial length of the axial body segment, wherein the flange fillet segment is circumferentially spaced from the axial segment.

In another embodiment according to any of the previous embodiments, the axial length of the axial body segment is greater than a radial height of the circumferential segment.

In another embodiment according to any of the previous embodiments, an interface ring abutting the first flange and the second flange.

In another embodiment according to any of the previous embodiments, the circumferential segment includes one of a projection or a channel. The axial body segment and flange fillet segment include the other of the projection or the channel.

In another exemplary embodiment, a method of assembling a duct for a gas turbine engine includes identifying a defect in a composite duct adjacent a first flange. A flange stiffener support is selected for engaging the first flange. The flange stiffener support includes a circumferential flange segment having a plurality of fastener openings for securing to the first flange. An axial body segment is aligned with the defect and attached to a body portion of the composite duct.

In another embodiment according to any of the previous embodiments, selecting the flange stiffener support includes slidably engaging the axially extending portion with the circumferential flange segment of the flange stiffener support.

In another embodiment according to any of the previous embodiments, the circumferential flange segment includes one of a protrusion or a channel. The axial body segment includes the other of the protrusion or the channel.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1A:
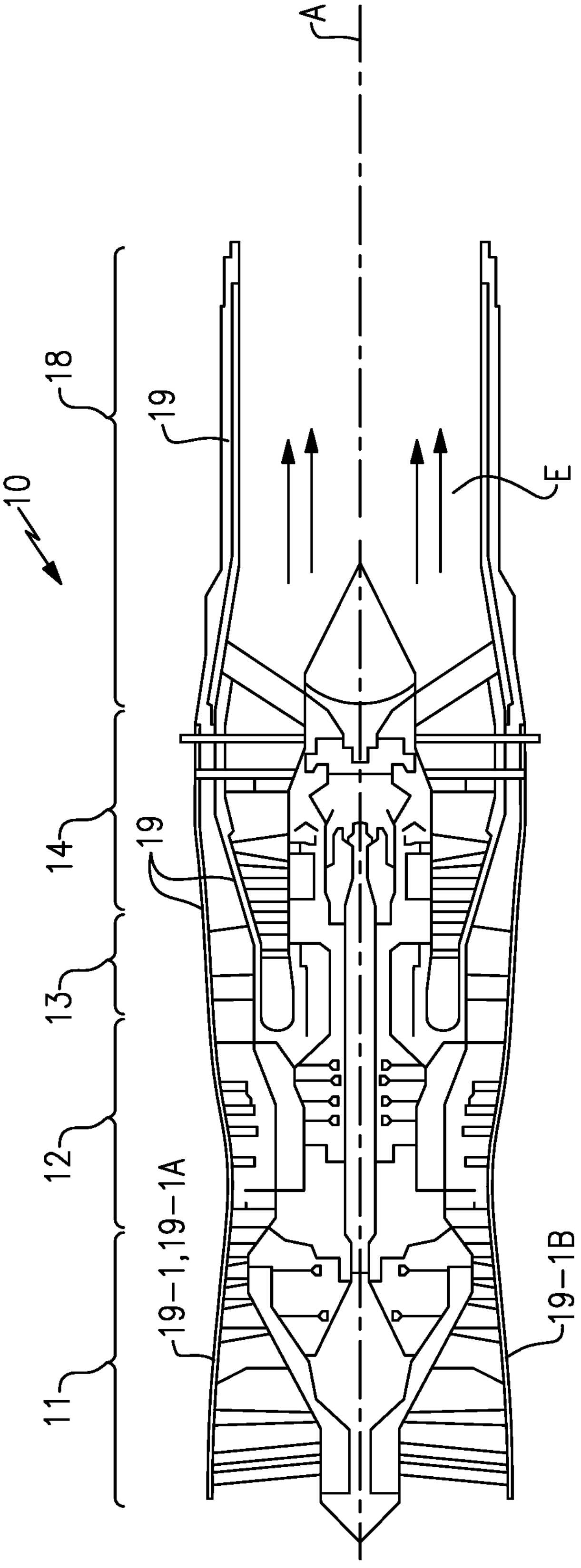
FIG. 1A illustrates an example gas turbine engine.

Referring to FIG. 1A, a gas turbine engine 10 includes a fan section 11, a compressor section 12, a combustor section 13, and a turbine section 14. Air entering into the fan section 11 is initially compressed and fed to the compressor section 12. In the compressor section 12, the incoming air from the fan section 11 is further compressed and communicated to the combustor section 13. In the combustor section 13, the compressed air is mixed with gas and ignited to generate a hot exhaust stream E. The hot exhaust stream E is expanded through the turbine section 14 to drive the fan section 11 and the compressor section 12. The exhaust gasses E flow from the turbine section 14 through an exhaust liner assembly 18.

The engine 10 includes one or more ducts 19 arranged about an engine central longitudinal axis A. The ducts 19 are dimensioned to bound a gas path of the engine 10, such as through the fan, compressor, and turbine sections 11, 12, 14 and the exhaust liner assembly 18. In the illustrative example of FIG. 1A, the engine 10 includes a first duct 19-1 that bounds a portion of the gas path through the fan section 11. The duct 19-1 includes a pair of duct halves (indicated at 19-1A, 19-1B) that establish a "split" duct circumferentially distributed and arranged in an array about the longitudinal axis A to bound the gas path.

Figure 1B:
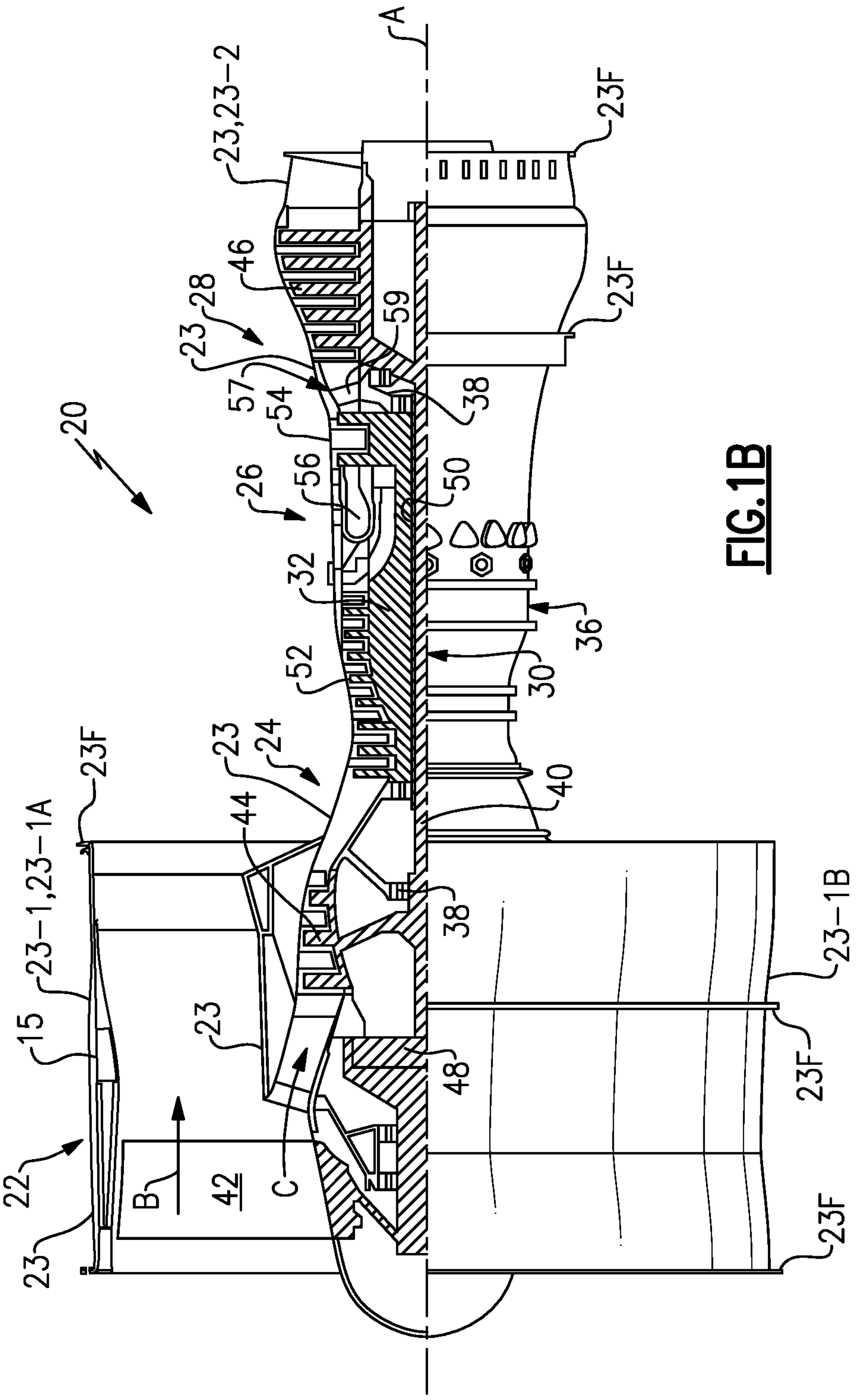
FIG. 1B illustrates another example gas turbine engine.

FIG. 1B schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15, such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ^\circ \text{ R})/(518.7^\circ \text{ R})]^{0.5}$. The "Low corrected fan tip speed" as disclosed herein according to one non-limiting embodiment is less than about 1150 ft/second (350.5 meters/second).

The engine 20 includes one or more ducts 23 arranged about the engine central longitudinal axis A. The ducts 23 are dimensioned to bound a gas path of the engine 20, such as the bypass flow path B through the fan section 22 and the core flow path C through the compressor and turbine sections 24, 28. Each duct 23 can include one or more flanges 23F dimensioned to mount the duct 23 to another component, such as another one of the ducts 23, or a nacelle or cowling. In the illustrative example of FIG. 1B, a first duct 23-1 establishes at least a portion of the housing 15. The first duct 23-1 bounds a flow path through the fan section 22, such as the bypass flow path B. The duct 23-1 includes a pair of duct halves (indicated at 23-1A, 23-1B) arranged about the longitudinal axis A. Another one of the ducts 23-2 can be incorporated in a turbine exhaust case (TEC) of the turbine section 28, for example.

Figure 2:
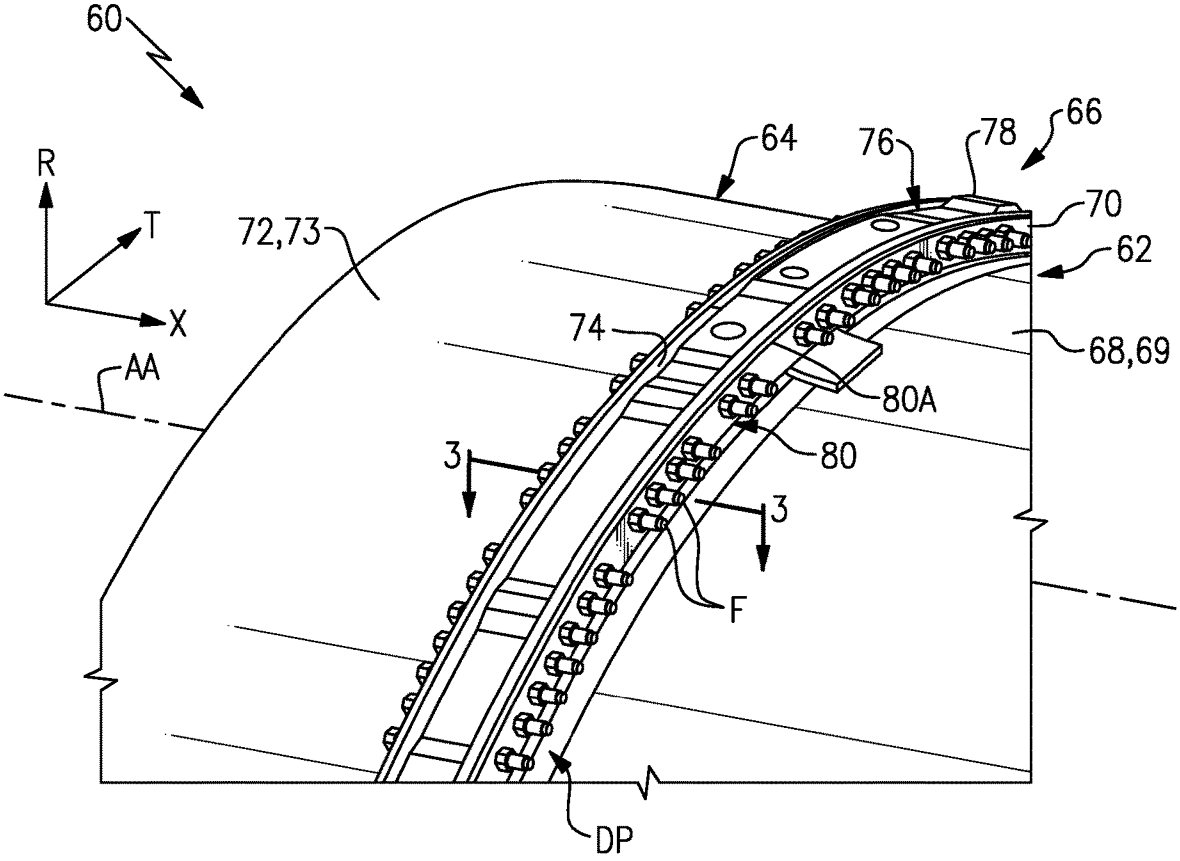
FIG. 2 illustrates a perspective view of an assembly including components coupled along a flanged interface.
Figure 3:
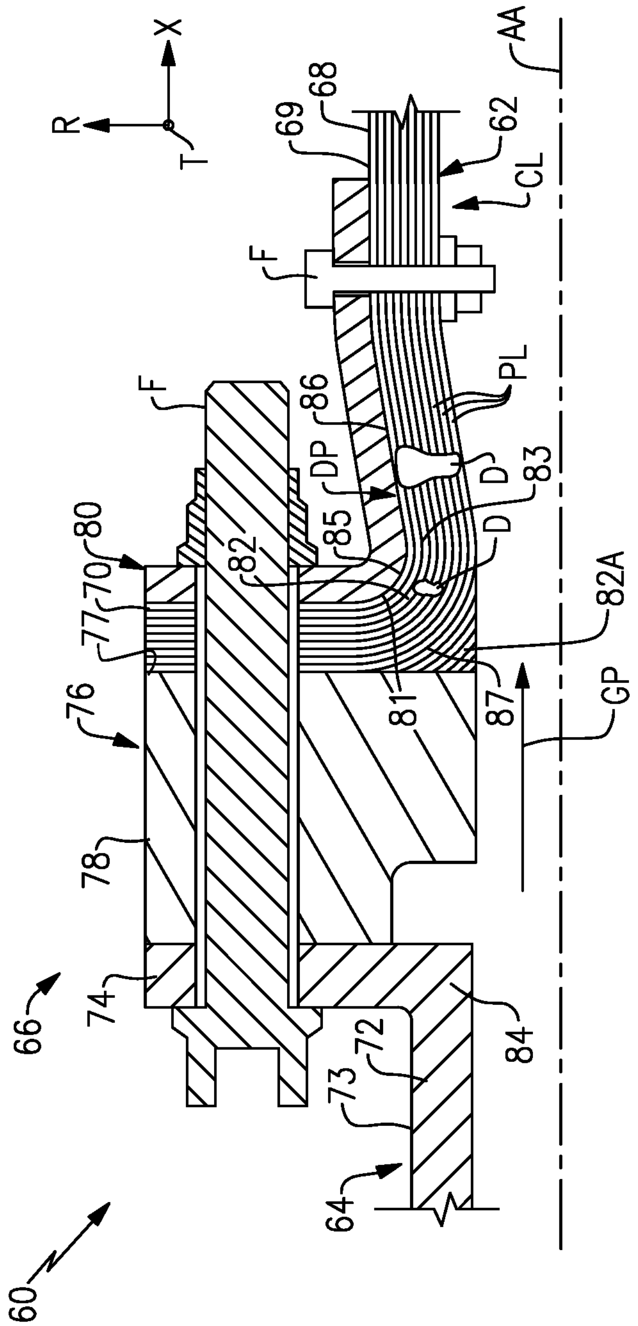
FIG. 3 illustrates a sectional view of the assembly taken along line 3-3 of FIG. 2.

FIGS. 2-3 illustrate an exemplary assembly 60 for a gas turbine engine. The assembly 60 can be incorporated into a portion of the gas turbine engines 10, 20 such as one of the ducts 19, 23, for example. Although the disclosed examples primarily refer to ducts, other gas turbine engine components and other systems can benefit from teachings disclosed herein, including composite casings and other structures having a flanged interface and systems lacking a fan for propulsion.

The assembly 60 includes a first gas turbine engine component 62 and a second gas turbine engine component 64. In the illustrative example of FIGS. 2-3, the assembly 60 is a duct assembly, the first component 62 is a first duct, and the second component 64 is a second duct. Each duct 62, 64 can be a split duct including a pair of duct halves circumferentially distributed and arranged in an array about a longitudinal axis to bound a gas path, as illustrated by the duct 19 of FIG. 1A. The first and second components 62, 64 are fixedly attached or otherwise secured at a flanged interface 66. The first component 62 includes a first main (or duct) body 68 and a first flange 70. The second component 64 includes a second main (or duct) body 72 and a second flange 74.

The main bodies 68, 72 of the first and second components 62, 64 extend along and about a longitudinal axis AA and cooperate to bound a gas path GP (FIG. 3). The longitudinal axis AA can be collinear with or parallel to with the engine longitudinal axis A of the engines 10, 20. The first and second flanges 70, 74 are arcuate or ring-shaped and are dimensioned to follow a circumference 69, 73 of the respective main bodies 68, 72 to at least partially or completely extend about the longitudinal axis AA to bound respective portions of the gas path GP.

The assembly 60 includes at least one interface ring 76 trapped or positioned between the flanges 70, 74. The interface ring 76 is dimensioned to extend at least partially or completely about the longitudinal axis AA. However, the interface ring 76 is not required. In the illustrative example of FIGS. 2-3, the interface ring 76 is a stiffener ring 78 trapped or positioned between the flanges 70, 74. The stiffener ring 78 can serve to provide increased rigidity and reduced deflection of the flanges 70, 74 along the flanged interface 66. The stiffener ring 78 can also serve to provide support for radial stiffening members of shaft bearings.

The assembly 60 includes at least one flange stiffener support 80 outward of the first flange 70. The flange stiffener support 80 is arranged such that the first flange 70 is trapped between the flange stiffener support 80 and the interface ring 76. The assembly 60 includes one or more fasteners F that fixedly attach the flanges 70, 74 to the interface ring 76. Example fasteners include bolts, screws, clips, pins and rivets. In the illustrative example of FIGS. 2-3, the fasteners F are bolts that mate with respective nuts. At least one fastener F extends through respective bores in the interface/stiffener ring 76/78 to fixedly attach the flanges 70, 74, as illustrated in FIG. 3.

Referring to FIG. 3, with continuing reference to FIG. 2, the main bodies 68, 72 extend in an axial (or first direction) X relative to the longitudinal axis AA. The main bodies 68, 72 extend in a circumferential (or second) direction T relative to the longitudinal axis AA, as illustrated in FIG. 2. The first flange 70 is an "upturned" flange that extends outwardly in a radial (or third) direction R from the first main body 68 at a first junction (or elbow) 82. The second flange 74 extends outwardly in the radial direction R from the second main body 72 at a second junction (or elbow) 84. The flanges 70, 74 extend in the circumferential direction T about the longitudinal axis AA, as illustrated in FIG. 2. It should be understood that the components 62, 64 including the respective flanges 70, 74 can be arranged at other orientations relative to the axes X, T and/or R in view of the teachings disclosed herein. For example, the flanges 70, 74 can be dimensioned to extend radially inwardly in the radial direction R from the respective main bodies 68, 72 to establish the flanged interface 66. In other examples, the flanges 70, 74 are dimensioned to extend axially parallel along the respective main bodies 68, 72 relative to the longitudinal axis AA.

The first and second junctions 82, 84 can have various geometries or profiles. The geometry of the first and second junctions 82, 84 can be the same or can differ. In the illustrative example of FIG. 3, the first junction 82 has a substantially arcuate geometry or profile with a corner filler 82A to create a substantially perpendicular profile at a radially inner side of the junction. The corner filler 82A includes ply layers that only extend in the region of the corner filler 82A and not along a length of the main body 68. The second junction 84 has a substantially perpendicular geometry or profile. For the purposes of this disclosure, the term "substantially" means±10% of the disclosed relationship or value unless otherwise stated.

Various materials can be utilized to form each of the first and second components 62, 64, interface/stiffener ring 76/78 and flange stiffener support 80. The first and/or second components 62, 64 including the first and second flanges 70, 74 can be made of metallic materials such as steel, nickel, aluminum and alloys or can be non-metallic materials such monolithic ceramics and composites including any of the composite materials disclosed herein.

In the illustrative example of FIG. 3, the first component 62 is a composite duct made of a composite layup CL. The composite layup CL includes a plurality of ply layers PL in stacked relationship that follow a contour 83 of the first junction 82 to establish at least a portion of the first main body 68 and the first flange 70. The component 62 is radiused along the contour 83 such that the junction 82 has a substantially arcuate profile, as illustrated in FIG. 3. The contour 83 defines a concave (or inner) face 85 and a convex (or outer) face 87 on opposed sides of the junction 82 that mates with the corner filler 82A. The faces 85, 87 of the junction 82 establish a substantially smooth transition between surfaces of the main body 68 and the first flange 70. In illustrative example of FIG. 3, one of the ply layers PL extends along the concave face 85 and another one of the ply layers PL extends along the convex face 87, and the ply layers PL are arranged such that the flange 70 is substantially perpendicular to the main body 68.

The ply layers CL can be arranged to establish an intermediate portion 86 interconnecting the first main body 68 and the first junction 82. The ply layers PL are arranged such that the ply layers PL slope radially inwardly from the first main body 68 in the radial direction R towards an adjacent portion of the first junction 82 with respect to the longitudinal axis AA, as illustrated in FIG. 3. The ply layers CL are arranged in the stacked relationship to establish a generally J-shaped cross-sectional geometry including the first junction 82. The arrangement of ply layers PL along the intermediate portion 86 establishes a depression DP extending in the circumferential direction T about the circumference 69 of the first component 62.

Various materials can be utilized to form the composite layup CL including the ply layers PL. For examples, the composite layup CL can be constructed from continuous and/or discontinuous fibers arranged in various orientations and in one or more ply layers PL based on structural requirements. Example fiber materials include, but are not limited to, fiberglass, an aramid such as Kevlar®, a ceramic such as Nextel™, and a polyethylene such as Spectra®. The ply layers PL can be constructed from uni-tape plies having a plurality of fibers oriented in the same direction or can be constructed from a two-dimensional and/or three-dimensional network of fibers, which can be woven or interlaced. Other example fiber constructions include a network of stitched or non-crimped fabrics. The network of fibers can be formed from a dry fiber preform, or can be formed from a pre-impregnated ("prepreg") fabric or tape having fibers pre-impregnated with resin in a matrix, for example. In other examples, the fibers are infused with resin in a matrix subsequent to laying up the ply layers PL on a layup tool. In examples, the composite layup CL is made of an organic matric composites (OMC) or a ceramic matrix composites (CMC) including fibers in a matrix material. One or more coatings can be applied to surfaces of the composite layup CL.

The interface ring 76 can be dimensioned such that the first flange 70 sits on or is otherwise supported by the interface ring 76 along an axial face of the first flange 70. In the illustrative example of FIG. 3, the interface ring 76 includes a flat mate face 77 having a constant axial dimension that mates with the first flange 70 and the corner filler 82A.

Figure 4:
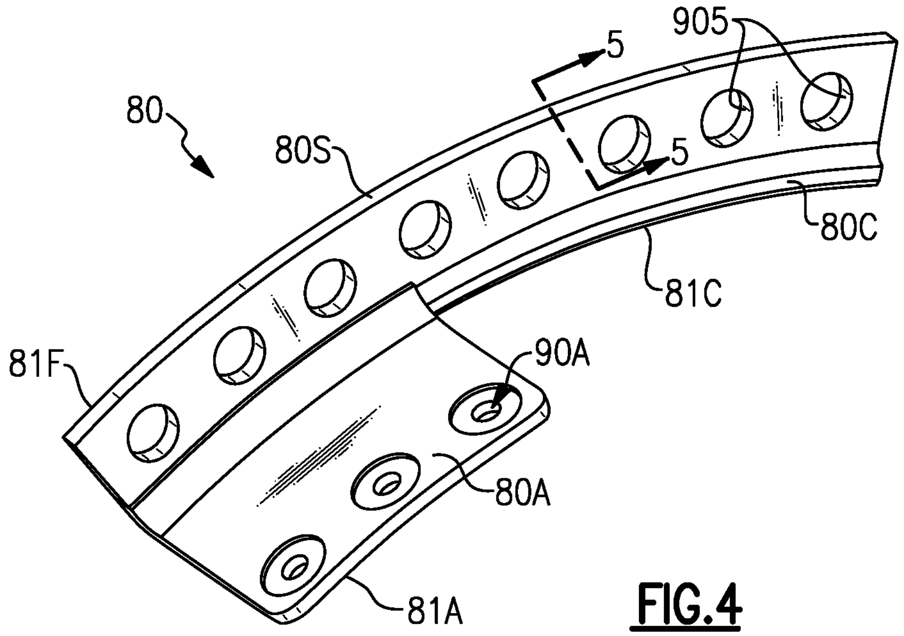
FIG. 4 illustrates a perspective view of an example flange stiffener support.
Figure 5:
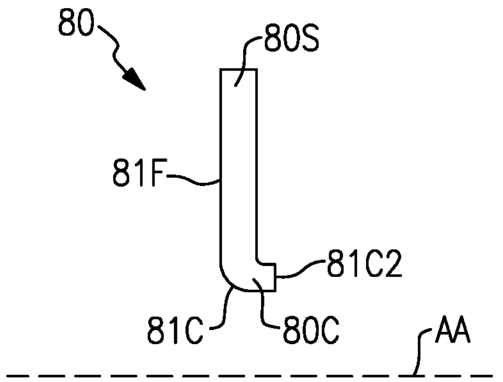
FIG. 5 illustrates a sectional view of the flange stiffener support taken along line 5-5 of FIG. 4.
Figure 6:
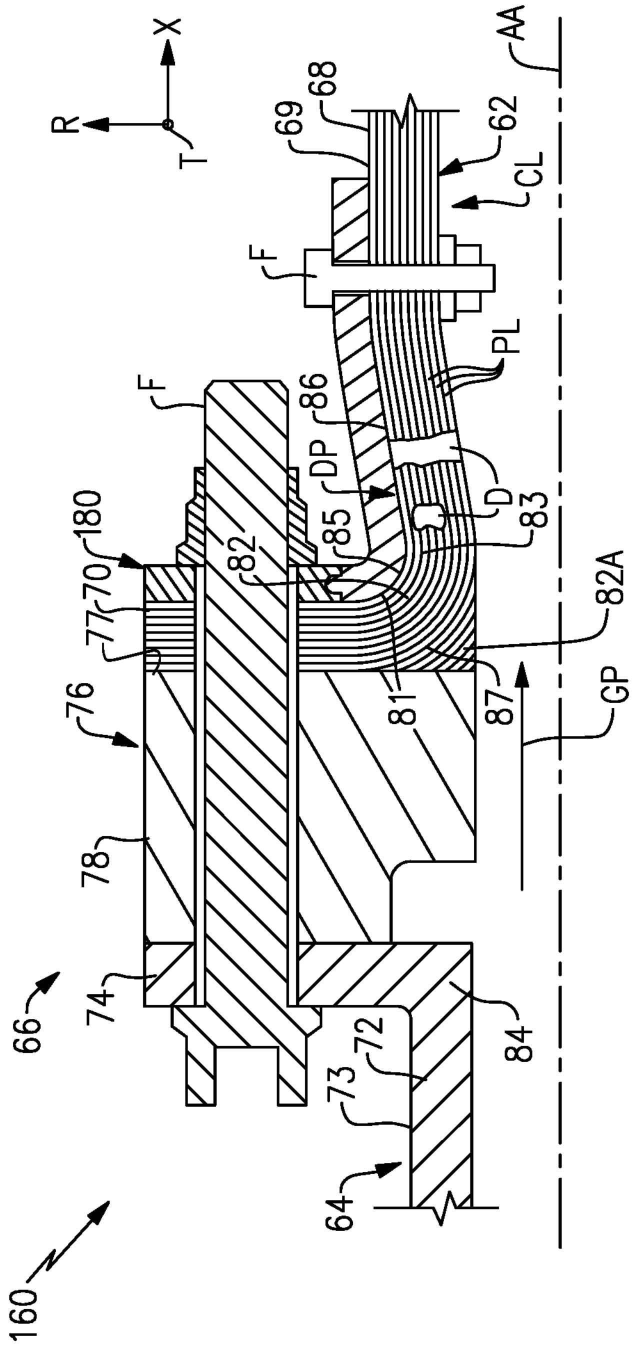
FIG. 6 illustrates a sectional view of an example modular flange stiffener support.
Figure 7:
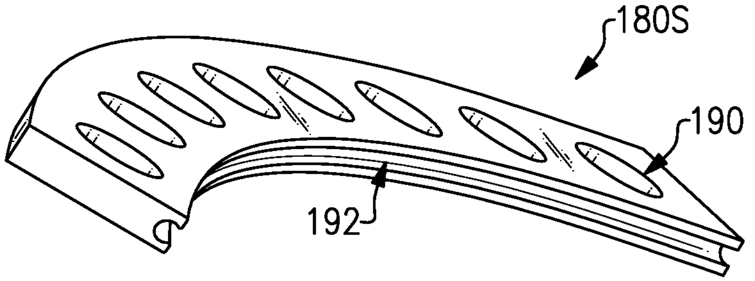
FIG. 7 illustrates a perspective view of an example circumferential flange segment of the modular assembly of FIG. 6.
Figure 8:
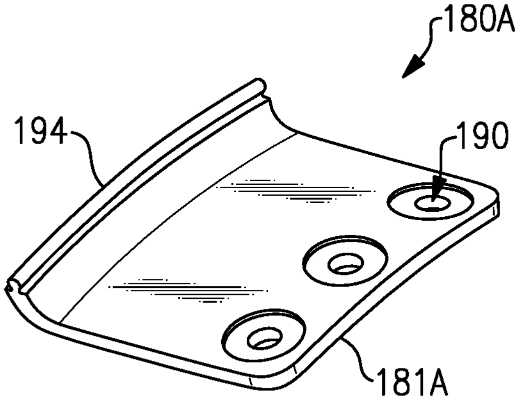
FIG. 8 illustrates a perspective view of an example axial body segment of the modular assembly of FIG. 6.
Figure 9:
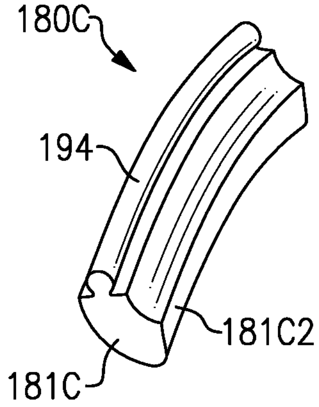
FIG. 9 illustrates a perspective view of an example flange fillet segment of the assembly of FIG. 6.

As shown in FIGS. 3-5, the flange stiffener support 80 includes a circumferential flange segment 80S with a flange fillet segment 80C and an axial body segment 80A both located adjacent a radially inner diameter of the circumferential flange segment 80S. The circumferential flange segment 80S includes an axially upstream surface 81F that directly contacts the first flange 70 and a plurality of fastener openings 90S for accepting a fastener that extends through the first flange 70.

The flange fillet segment 80C includes a flange fillet surface 81C that engages the concave face 85 on the main body 68. The flange fillet segment 80C also extends lengthwise in a circumferential direction to follow an outer contour of the main body 68 of first duct 62. The flange fillet surface 81C is dimensioned to substantially follow or complement the concave face 85 of the contour 83 such that the flange fillet surface 81C is opposed to the mate face 77 of the interface ring 76 on the opposite side of the first flange 70. As shown in FIG. 5, the flange fillet segment 80C includes an axially aft most surface 81C2 that is axially downstream from an aft most surface of flange fillet segment 80C. One feature of this configuration is a greater contact area with the first duct 62 for load transfers.

The axial body segment 80A includes a radially inward facing surface 81A that is dimensioned to substantially follow or complement the concave face 85 of the contour 83. In the illustrated example, the radially inward facing surface 81A is opposed to the mate face 77 of the interface ring 76 on the opposite side of the first flange 70 in a first region and a flow path, such as the core flow path or the bypass flow path B, in a second region. The axial body segment 80A also includes fastener openings 90A adjacent a distal end for accepting a fastener F extending through the main body 68 of the first duct 62. In one example, the fastener openings 90A are located in a distal 50% of the axial body segment 80A and in another example, the fastener openings are located in a distal 25% of the axial body segment 80A. Additionally, in the illustrated example, an axial length of the axial body segment 80A is greater than a radial height of the circumferential flange segment 80S. Also, the axial body segment 80A is circumferentially offset from the flange fillet segment 80C relative to the same circumferential flange segment 80S.

One feature of locating the fastener openings 90A adjacent the distal end of the axial body segment 80A is that the fasteners F create a load path through the first flange 70, into the flange stiffener support 80, and through the fasteners F to the main body 68 of the first duct 62 to bypass defects in the duct 72 adjacent the first flange 70 as will be discussed in greater detail below. Additionally, a longitudinal axis of the fastener openings 90A is substantially perpendicular to a longitudinal axis of the fastener openings 90S.

Multiple flange stiffener supports 80 are arranged together to follow the first flange 70 about a circumference of the duct 62 as shown in FIG. 2. At least one of the flange stiffener supports 80 includes the axial body segment 80A with or without the flange fillet segment 80C. The inclusion of the flange fillet segment 80C with the axial body segment 80A on a single flange stiffener support 80 depends on the size and location of a defect D (See FIG. 3) in the duct relative to the flange stiffener support 80. Also, an amount of radial variation in the axial direction can vary depending on a size of the depressed portion DP. In this disclosure, radial or radially, circumference or circumferentially, and axial or axially is relative to one of the axes A or AA unless stated otherwise.

As shown in the illustrated example of FIG. 4, the axial body segment 80A only extends along a portion of the circumferential width of the flange stiffener support 80. In one example, the axial body segment 80A extends less than half the circumferential width of the flange stiffener support 80. In another example, the axial body segment 80A extends at least 50% and up to 100% of the circumferential width of the flange stiffener support 80. Additionally, while the illustrated example shows the axial body segment 80A located adjacent a circumferential end of the circumferential flange segment 80S, the axial body segment 80A could be located circumferentially inward from opposing circumferential ends of the circumferential flange segment 80S. This would allow separate flange fillet segments 80C to separate the axial body segment 80A from the opposing circumferential ends of the flange stiffener support 80.

One feature of the flange stiffener support 80 is improved reinforcement of the main body 68 in the region of the first flange 70. In particular, it is possible for the first junction 82 and/or the main body 68 of the first duct 62 to include defects D in the ply layers PL from manufacturing that reduces the strength of the first duct 62 adjacent the first flange 70. If the defects D exceed predetermined criteria, such as size and location, the entire duct 62 might need to be discarded at a substantial financial loss and timing delay. Because the axial body segment 80A extends axially past the first junction 82 and is fastened to the main body 68 with the fasteners F, a load path through the first flange 70 will bypass the defects D and extend to the main body 68. This can reduce the number of ducts 62 in the field that need to be replaced as the first junction 82 is also a region that experiences damage during use.

Also, as the region of the first junction 82 is a possible region that can experience damage during operation, this flange stiffener support 80 can also repair ducts 62 that might otherwise be found unrepairable. In particular, as shown in FIG. 3, the defect D could extend entirely through the main body 68 of the first duct. The defect D could then be patched or filled with the area of the defect then strengthened by the axial body segment 80A being circumferentially and axially aligned with an exterior of the defect D.

FIGS. 6-11 illustrate another example assembly 160 with a flange stiffener support 180 similar to the flange stiffener support 80 except where described below or shown in the Figures. Like or similar features between the flange stiffener support 80 and the flange stiffener support 180 will be identified with a leading "1."

In the illustrated examples, the flange stiffener support 180 includes a circumferential flange segment 180S, at least one axial body segment 180A, and at least one flange fillet segment 180C circumferentially offset from the at least one axial body segment 180A. Both the axial body segment 180A and the flange fillet segment 180C circumferentially overlap with the circumferential flange segment 180S. However, the axial body segment 180A could extend an entire circumferential width of the circumferential flange segment 180S without a flange fillet segment 180C.

As shown in FIGS. 6-7 and 10-11, the circumferential flange segment 180S includes a channel 192 that extends along a radially inner side of the circumferential flange segment 180S. The channel 192 also extends circumferentially in a lengthwise direction to follow an outer contour of the main body 68 of the first duct 62. The channel 192 is configured to mate with a protrusion (or ridge) 194 on a radially outer edge of the flange fillet segment 180C or the axial body segment 180A. The protrusion (or ridge) 194 also extends circumferentially in a lengthwise direction to follow an outer contour of the main body 68 of the first duct 62 and the channel 192. Interfacing ledges are also located on oppose sides of the channel 192 and protrusion (or ridge) 194 to prevent rotational movement of the circumferential flange segment 180S relative to the axial and flange fillet segments 180A, 180C.

Figure 10:
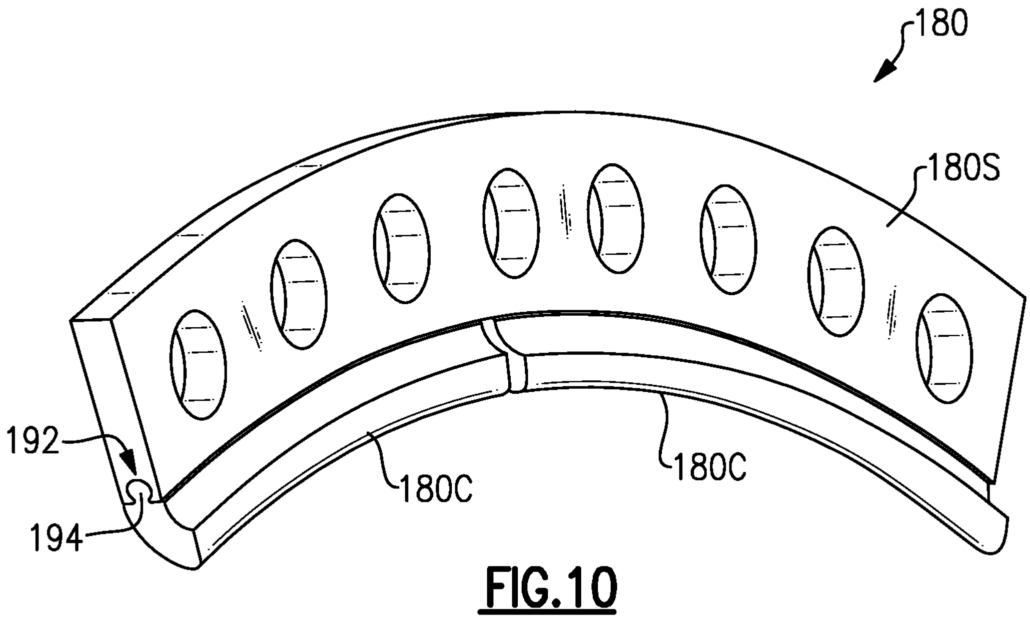
FIG. 10 illustrates a pair of flange fillet/contoured segments attached to the circumferential flange segment.
Figure 11:
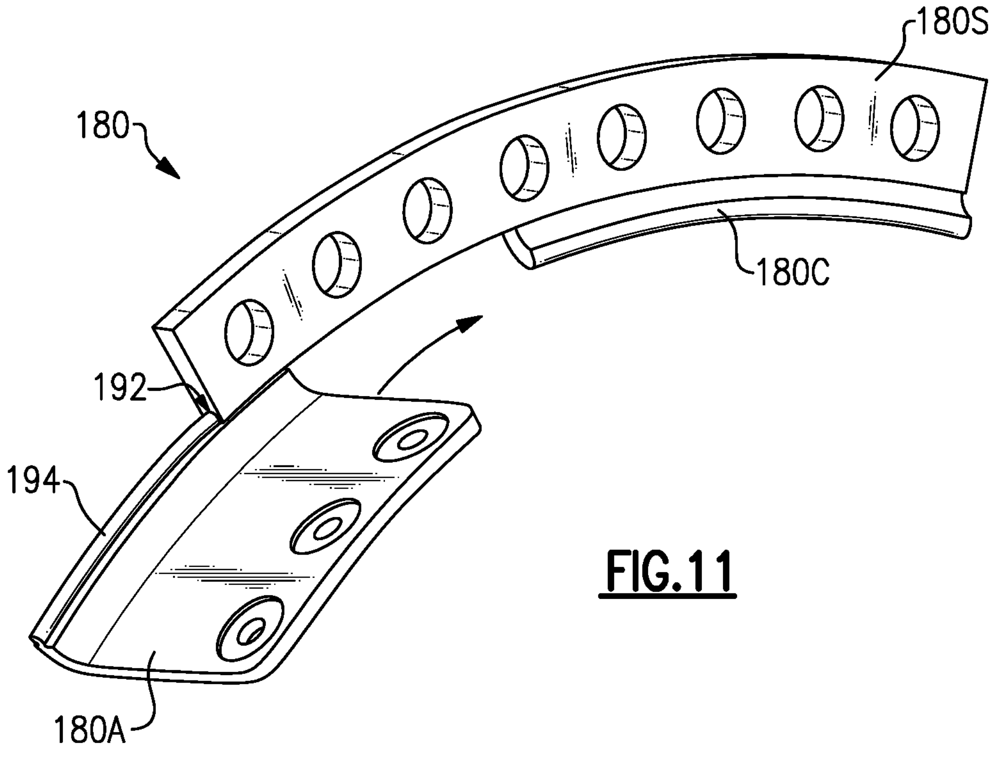
FIG. 11 illustrates the flange fillet segment and the axial body segment attached to the circumferential flange segment.

One feature of having the channel 192 and protrusion (or ridge) 194 is to allow the axial body segment 180A and the flange fillet segment 180C to engage by sliding in a circumferential direction relative to the circumferential flange segment with relative movement there between in the circumferential direction (See FIG. 11). This also provides improved customization of the location of the axial body segment 180A relative to the main body 68 of the first duct 62 without needed to manufacture a specific part that only provides a single configuration. For example, as shown in FIGS. 10-11, multiple flange fillet segments 180C with different circumferential widths can mate with the circumferential flange segment 180S. Similarly, axial body segments 180A with different circumferential widths could also mate with the flange fillet segment 180C.

Figure 12A:
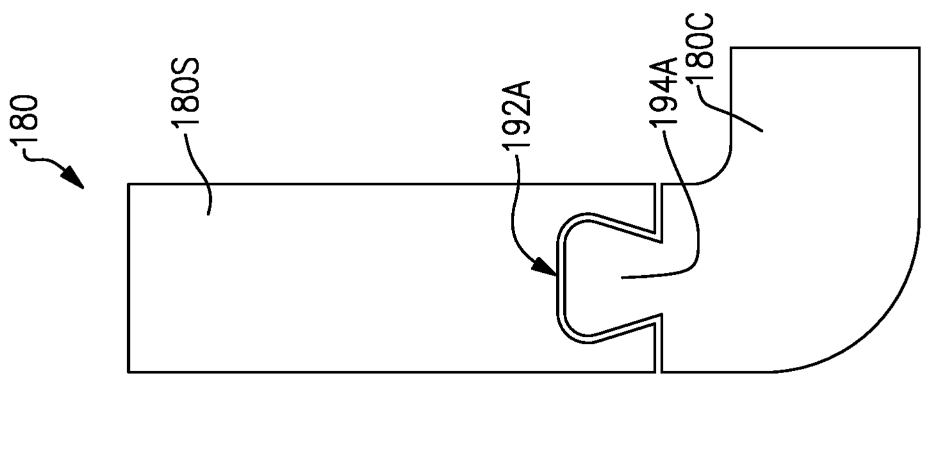
FIG. 12A illustrates an end view of the circumferential flange segment and the flange fillet segment with another example protrusion and channel.
Figure 12B:
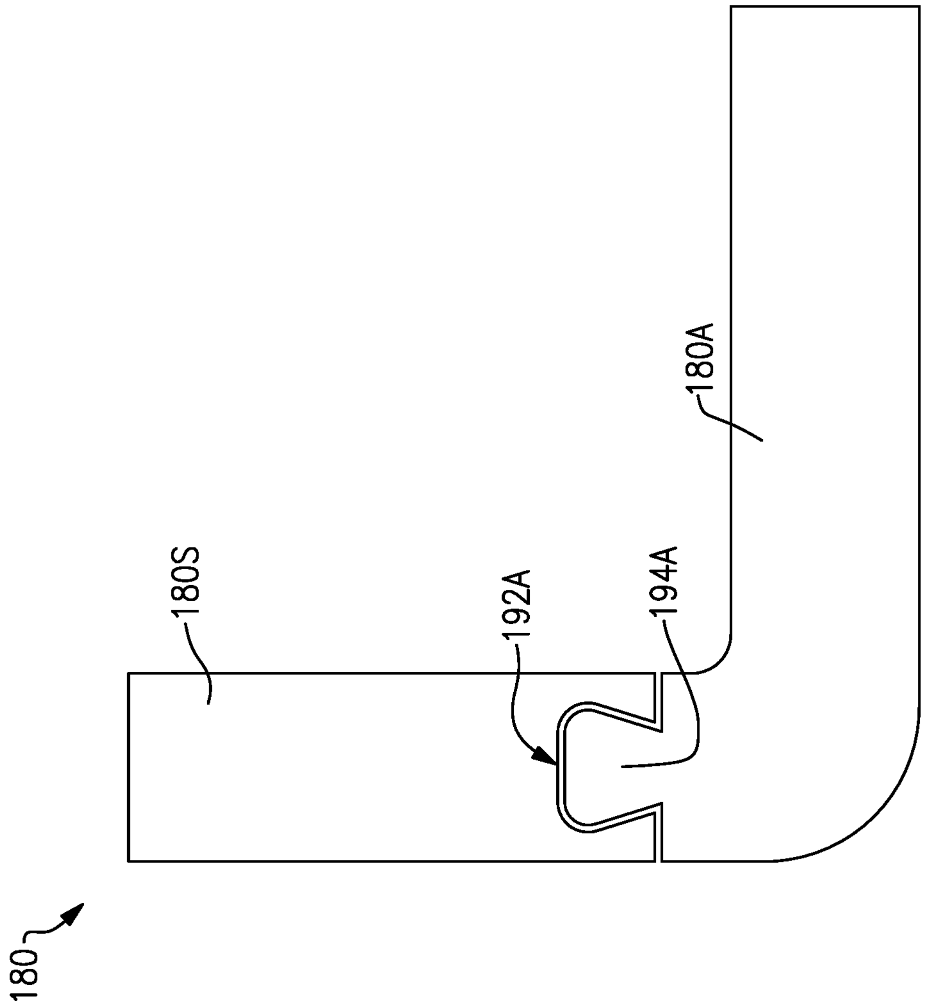
FIG. 12B illustrates an end view of the circumferential flange segment and the axial body segment with the example protrusion and channel of FIG. 12A.
Figure 13B:
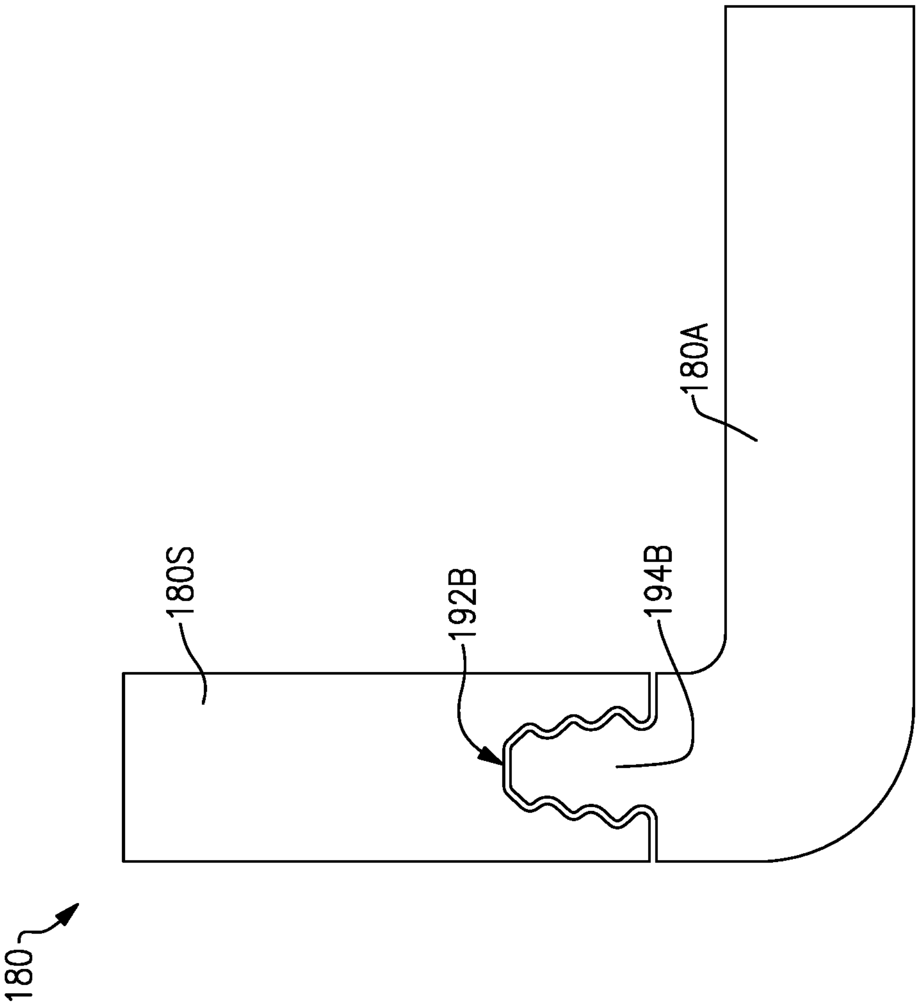
FIG. 13B illustrates an end view of the circumferential flange segment and the axial body segment with the example protrusion and channel of FIG. 13A.
Figure 13A:
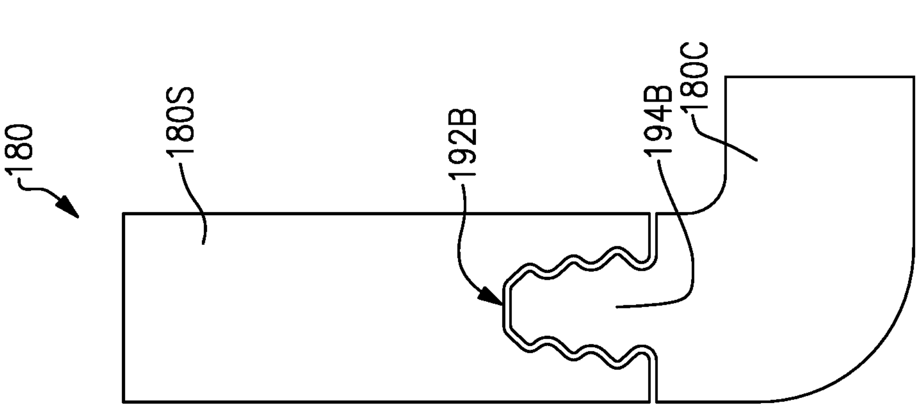
FIG. 13A illustrates an end view of the circumferential flange segment and the flange fillet segment with yet another example protrusion and channel.

While the protrusion (or ridge) 194 are located on the axial body segment 180A and the flange fillet segment 180C to mate with the channel 192 on the circumferential flange segment 180S in the illustrated example, the channel 192 could be located on the axial body segment 180A and the flange fillet segment 180C with the protrusion (or ridge) 194 located on the circumferential flange segment 180S. As the illustrated example shows, the channel 192 and protrusion (or ridge)s 194 have complementary semicircular shapes, but other complementary shapes could be used for the channel 192 and the protrusion (or ridge)s 194. In particular, as shown in FIGS. 12A and 12B, the circumferential flange segment 180S could include a channel 192A and the flange fillet segment 180C and the axial body segment 180A each include a complementary protrusion 194A having a dovetail profile. Furthermore, as shown in FIGS. 13A and 13B, the circumferential flange segment 180S could include a channel 192B and the flange fillet segment 180C and the axial body segment 180A each include a complementary protrusion 194B having a fir tree profile defined by a triangular profile having a number of protrusions on sides adjacent a distal tip of the triangular profile.

As shown in FIGS. 7-11, the channel 192 and the protrusion (or ridge) 194 follow complementary arcuate profiles that allow either the flange fillet segment 180C or the axial body segment 180A to slide into and out of engagement with the circumferential flange segment 180S. One feature of the ability to select a position of the axially extending portion 180E and the flange fillet segment 180C is the ability to customize the flange stiffener support 180 to any specific damage or defects D in the plies P of the duct 62 without requiring a custom machined part or maintaining a large supply of replacement parts. Additionally, if only one of the circumferential flange segment 180S, axial body segment 180A, or flange fillet segment 180C become damaged or worn, only the damaged or worn components needs to be replaced.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A flange stiffener support for a duct in a gas turbine engine and comprising:

a circumferential flange segment having a plurality of flange fastener openings; and an axial body segment extending from a radially inner side of the circumferential flange segment, the axial body segment having at least one body fastener opening, wherein the axial body segment extends partially along a circumferential distance of the circumferential flange segment;

including a flange fillet segment extending from the radially inner side of the circumferential flange segment with an axial length less than an axial length of the axial body segment, wherein the flange fillet segment is circumferentially spaced from the axial body segment.

2. The flange stiffener support of claim 1, wherein the axial length of the axial body segment is greater than a radial height of the circumferential flange segment.

3. The flange stiffener support of claim 1, wherein the circumferential flange segment, the axial body segment, and the flange fillet segment form a single unitary piece.

4. The flange stiffener support of claim 1, wherein the flange fillet segment extends axially aft of an aft most surface on the circumferential flange segment.

5. The flange stiffener support of claim 1, wherein the circumferential flange segment includes one of a protrusion or a channel and the axial body segment and flange fillet segment each include the other of the protrusion or the channel.

6. The flange stiffener support of claim 5, wherein each of the protrusion and the channel include a lengthwise direction that extends circumferentially with the circumferential flange segment.

7. The flange stiffener support of claim 6, wherein axial body segment extends a first circumferential distance and the flange fillet segment extends a second circumferential distance different from the first circumferential distance.

8. The flange stiffener support of claim 5, wherein a circumferential end of the axial body segment abuts a circumferential end of the flange fillet segment and a longitudinal axis of the at least one body fastener opening extends substantially perpendicular to a longitudinal axis the plurality of fastener openings in the circumferential flange segment.

9. The flange stiffener support of claim 5, wherein the protrusion includes one of a dovetail profile or an arcuate profile.

10. The flange stiffener support of claim 5, wherein the protrusion includes a fir tree profile.

11. A gas turbine engine comprising:

a fan section;

a compressor section;

a turbine section that drives the fan section and the compressor section; and a duct assembly comprising:

a first duct including a main body and a first flange, wherein the first duct is made of a composite material;

a second duct include including a main body and a second flange; and a flange stiffener support engaging the first flange, the first flange including a circumferential flange segment, an axial body segment having a plurality of fastener openings, wherein the axial body segment extending from a radially inner side of the circumferential flange segment having at least one body fastener opening, the axial body segment extends along a circumferential distance of the circumferential flange segment, and the axial body segment being secured to the first duct main body by fasteners, with the first duct main body forming an annular structure, and the axial body segment extending only over a portion of a circumference of the first duct main body.

12. The gas turbine engine of claim 11, including a flange fillet segment extending from the radially inner side of the circumferential flange segment with an axial length less than an axial length of the axial body segment, wherein the flange fillet segment is circumferentially spaced from the axial segment.

13. The gas turbine engine of claim 11, wherein the axial length of the axial body segment is greater than a radial height of the circumferential flange segment.

14. The gas turbine engine of claim 11, including an interface ring abutting the first flange and the second flange.

15. The gas turbine engine of claim 11, wherein the circumferential flange segment includes one of a projection or a channel and the axial body segment and flange fillet segment include the other of the projection or the channel.

16. A method of assembling a duct for a gas turbine engine, the method comprising:

identifying a defect in a composite duct adjacent a first flange; and selecting a flange stiffener support for engaging the first flange, wherein the flange stiffener support includes a circumferential flange segment having a plurality of fastener openings for securing to the first flange and an axial body segment aligned with the defect and attached to a body portion of the composite duct.

17. The method of claim 16, wherein selecting the flange stiffener support includes slidably engaging the axially extending portion with the circumferential flange segment of the flange stiffener support.

18. The method of claim 17, wherein the circumferential flange segment includes one of a protrusion or a channel and the axial body segment include the other of the protrusion or the channel.

* * * * *